US011980929B2

(12) United States Patent
Uemoto et al.

(10) Patent No.: US 11,980,929 B2
(45) Date of Patent: May 14, 2024

(54) MANUFACTURING METHOD FOR HOLLOW RACK BAR AND HOLLOW RACK BAR MANUFACTURING APPARATUS

(71) Applicant: NETUREN CO., LTD., Tokyo (JP)

(72) Inventors: Toshifumi Uemoto, Tokyo (JP); Nobumoto Ishiki, Tokyo (JP); Takashi Yamawaki, Tokyo (JP)

(73) Assignee: NETUREN CO., LTD., Tokyo (JP)

( * ) Notice: Subject to any disclaimer, the term of this patent is extended or adjusted under 35 U.S.C. 154(b) by 535 days.

(21) Appl. No.: 16/764,251

(22) PCT Filed: Nov. 15, 2018

(86) PCT No.: PCT/JP2018/042288
§ 371 (c)(1),
(2) Date: May 14, 2020

(87) PCT Pub. No.: WO2019/102927
PCT Pub. Date: May 31, 2019

(65) Prior Publication Data
US 2020/0277002 A1 Sep. 3, 2020

(30) Foreign Application Priority Data

Nov. 21, 2017 (JP) .................................. 2017-223770

(51) Int. Cl.
B21K 1/76 (2006.01)
B21J 5/12 (2006.01)
(Continued)

(52) U.S. Cl.
CPC ................. *B21K 1/768* (2013.01); *B21J 5/12* (2013.01); *B62D 3/126* (2013.01); *B21C 1/24* (2013.01); *F16H 55/26* (2013.01)

(58) Field of Classification Search
CPC .... B21C 1/22; B21C 1/24; B21C 1/18; B21C 1/16; B21K 1/767; B21K 1/768
See application file for complete search history.

(56) References Cited

U.S. PATENT DOCUMENTS 4,788,841 A * 12/1988 Calhoun ................... B21C 1/24
72/283
2006/0201227 A1* 9/2006 Lepre ...................... B62D 21/11
72/370.14

(Continued)

FOREIGN PATENT DOCUMENTS

AU       595108       9/1989
CN       101524722    9/2009
(Continued)

OTHER PUBLICATIONS

Information Offer dated Jan. 17, 2022 issued in corresponding Japanese patent application 2017-223770 with English translation.
(Continued)

Primary Examiner — Debra M Sullivan
(74) Attorney, Agent, or Firm — WENDEROTH, LIND & PONACK, L.L.P.

(57) ABSTRACT

A manufacturing method is provided for a hollow rack bar made of a hollow shaft material and including a toothed section which has a rack on an outer surface and a shaft section which is thinner than the toothed section. The manufacturing method includes: (i) drawing the hollow shaft material using a die and a plug, and preforming regions of the hollow shaft material including a toothed section formation region configured to become the toothed section and a shaft section formation region configured to become the shaft section so as to have thicknesses according to the respective regions; and (ii) forming the rack at the toothed section formation region of the hollow shaft material which is preformed.

4 Claims, 8 Drawing Sheets

(51) Int. Cl.
    *B62D 3/12*    (2006.01)
    *B21C 1/24*    (2006.01)
    *F16H 55/26*    (2006.01)

(56) References Cited

U.S. PATENT DOCUMENTS

| | | |
|---|---|---|
| 2007/0204668 A1 | 9/2007 | Shiokawa |
| 2008/0115553 A1 | 5/2008 | Brochheuser et al. |
| 2008/0148795 A1 | 6/2008 | Hayashi |
| 2008/0184833 A1* | 8/2008 | Dohmann ............. B21J 5/12 74/498 |
| 2009/0038360 A1 | 2/2009 | Hayashi |

FOREIGN PATENT DOCUMENTS

| | | |
|---|---|---|
| DE | 195 08 798 | 9/1995 |
| EP | 0 099 311 | 1/1984 |
| EP | 1 177 843 | 2/2002 |
| FR | 2 529 983 | 1/1984 |
| JP | 1-143713 | 6/1989 |
| JP | 5-345231 | 12/1993 |
| JP | 9-52113 | 2/1997 |
| JP | 2013-43202 | 3/2013 |
| WO | 2006/053590 | 5/2006 |
| WO | 2016/017158 | 2/2016 |
| WO | WO-2017078243 A1 * | 5/2017 ............. B21C 1/16 |

OTHER PUBLICATIONS

Pipe Working Methods, Nikkan Kogyo Shimbun, Ltd., pp. 180-181 with partial English translation, Sep. 30, 1982.
International Search Report and Written Opinion of the International Searching Authority, dated Feb. 18, 2019 in corresponding International Patent Application No. PCT/JP2018/042288.

* cited by examiner

MANUFACTURING METHOD FOR HOLLOW RACK BAR AND HOLLOW RACK BAR MANUFACTURING APPARATUS

CROSS-REFERENCE TO RELATED APPLICATION

This application claims priority to Japanese Patent Application No. 2017-223770 filed on Nov. 21, 2017, the entire content of which is incorporated herein by reference.

TECHNICAL FIELD

The present invention relates to a manufacturing method for a hollow rack bar for use in a rack-and-pinion steering system of a motor vehicle or the like and a hollow rack bar manufacturing apparatus.

BACKGROUND ART

As a rack bar for use in a rack-and-pinion steering system of the like, for example, a hollow rack bar is known in which a rack is formed on a cylindrical solid shaft material, while a so-called hollow rack bar is also known in which a cylindrical hollow shaft material is used for reducing the weight of the rack bar.

A shaft material for use for a hollow rack bar generally has a cross section which is substantially constant along an axial direction, and its thickness is set according to the height of rack teeth. A thickness which is set according to the height of rack teeth is excessive for a shaft section excluding a toothed section where a rack is formed. Hence, a hollow rack bar is also known in which a shaft section is formed thinner than a toothed section not only to reduce the weight of the rack bar but also to save on a material used for the rack bar (for example, refer to JP-A-5-345231).

SUMMARY OF THE INVENTION

Problem that the Invention is to Solve

In the hollow rack bar described in JP-A-5-345231, the toothed section is formed relatively thick while the shaft section is formed relatively thin by drawing a shaft material as a base material; however, no specific drawing process is described in JP-A-5-345231.

The invention has been made in view of the situation described above, and an object of the invention is to provide a method and apparatus for manufacturing a hollow rack bar which can reduce the weight thereof and save on a material used therefor.

Means for Solving the Problem

In an aspect (1), a manufacturing method for a hollow rack bar made of a hollow shaft material and including a toothed section which has a rack on an outer surface and a shaft section which is formed thinner than the toothed section, the manufacturing method includes drawing the hollow shaft material by using a die and a plug, and preforming regions of the hollow shaft material including a toothed section forming region configured to form the toothed section and a shaft section forming region configured to form the shaft section to have thicknesses according to the regions respectively, and forming the rack at the toothed section forming region of the hollow shaft material which is preformed. The plug has a first working section and a second working section having a larger diameter than that of the first working section, as working sections to define inside diameters of the hollow shaft material. In the preforming, when the toothed section forming region passes through the die, the first working section of the plug is disposed inside a working section of the die configured to define an outside diameter of the hollow shaft material, and when the shaft section forming region passes through the die, the second working section of the plug is disposed inside the working section of the die.

In an aspect (2), a reduction rate from sectional areas at the toothed section forming region and the shaft section forming region of the hollow shaft material perpendicular to an axial direction of the hollow shaft material before the preforming, to the sectional areas after the preforming, is 10% or larger and 35% or smaller.

In an aspect (3), in forming the rack, a mandrel is press fitted in the hollow shaft material in a state that a tooth die is pressed against the toothed section forming region and a material of the toothed section forming region is caused to plastically flow towards the tooth die to form the rack.

In an aspect (4), a hollow rack bar manufacturing apparatus, the hollow rack bar made of a hollow shaft material and including a toothed section which has a rack on an outer surface and a shaft section which is formed thinner than the toothed section, the apparatus includes a die having a working section configured to define an outside diameter of the hollow shaft material;

a plug having working sections configured to define inside diameters of the hollow shaft material, a driving unit configured to move the plug in an axial direction of the hollow shaft material, and a drawing unit configured to draw the hollow shaft material through between the die and the plug. The plug has a first working section and a second working section having a larger diameter than that of the first working section, as the working sections. When a toothed section forming region of the hollow shaft material configured to form the toothed section passes through the die, the driving unit disposes the first working section of the plug inside the working section of the die configured to define the outside diameter of the hollow shaft material, and when a shaft section forming region of the hollow shaft material configured to form the shaft section passes through the die, the driving unit disposes the second working section of the plug inside the working section of the die.

Advantageous Effect of the Invention

According to the invention, it is possible to provide the method and apparatus for manufacturing the hollow rack bar which can reduce the weight and save on the material of the rack bar.

MODE FOR CARRYING OUT THE INVENTION

Figure 1:
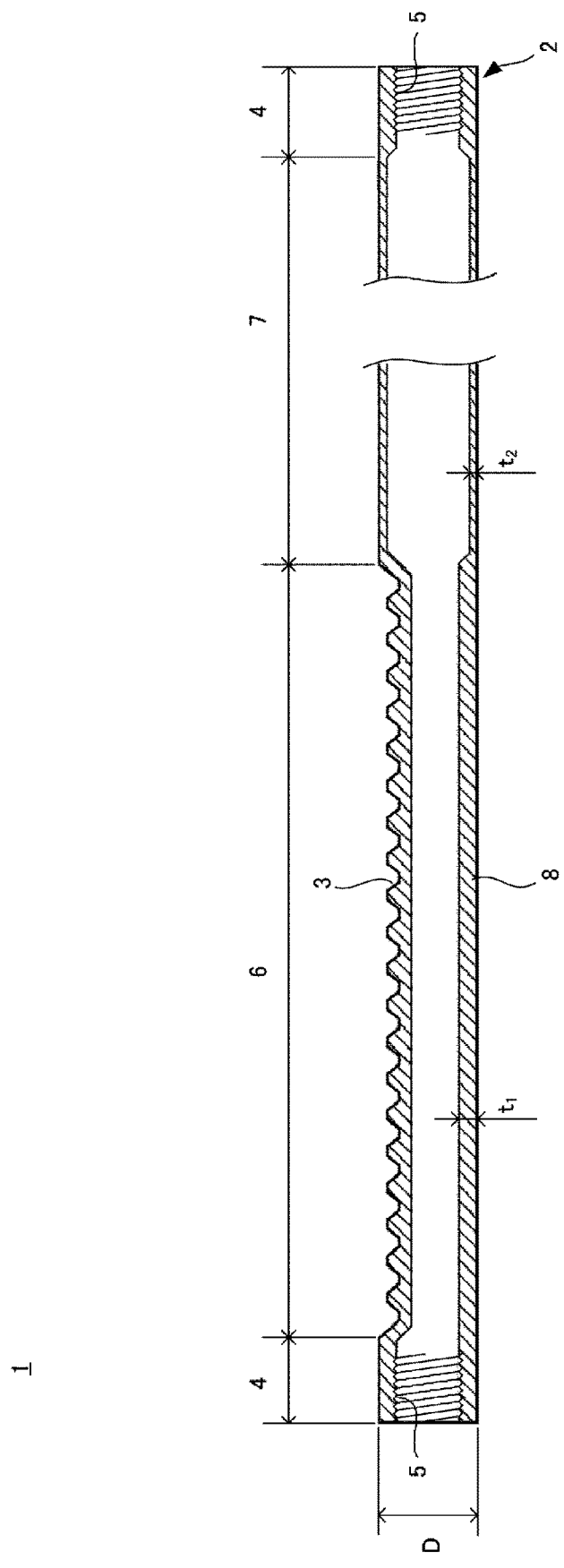
FIG. 1 is a sectional view of an example of a rack bar for describing an embodiment of the invention.

FIG. 1 shows an example of a rack bar for describing an embodiment of the invention.

A hollow rack bar 1 is made up of a single cylindrical hollow shaft material 2, and a rack 3 is formed at part of an outer surface of the shaft material 2. A joining section 4, to which a joint where a tie-rod of a steering system is coupled is joined, is provided at each end portion of the shaft material 2 in an axial direction, and a female thread 5 is formed on an inner circumferential surface of the joining section 4. Hereinafter, the hollow rack bar 1 is divided, in the axial direction, into a section where the rack 3 is formed, the section being referred to as a toothed section 6, and a section excluding the toothed section 6 and the joining sections 4, the section being referred to as a shaft section 7.

When a thickness of an arc section 8 of the toothed section 6 excluding the rack 3 is referred to as $t_1$ and a thickness of the shaft section 7 is referred to as $t_2$, then, $t_1 > t_2$, and the shaft section 7 is formed thinner than the toothed section 6. In this embodiment, the joining section 4 is given a thickness $t_1$ which is the same as that of the toothed section 6; however, the joining sections 4 may be formed thinner than the toothed section 6 or may be formed thicker than the toothed section 6.

In this embodiment, the rack 3 has a constant gear ratio (CGR) in which rack teeth are formed at a constant pitch. However, the rack 3 may have a variable gear ratio (VGR) in which rack teeth are formed at a variable pitch.

FIGS. 2 to 5 show a series of steps of manufacturing the hollow rack bar 1.

Figure 2:
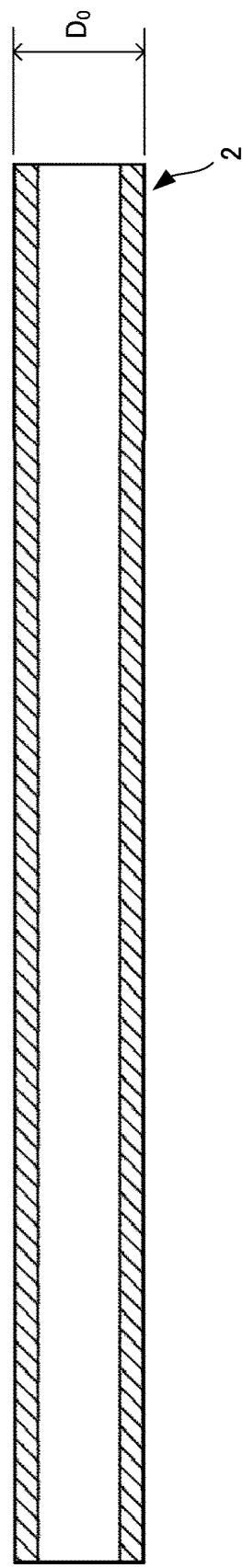
FIG. 2 is a schematic drawing showing a manufacturing step of the rack bar in FIG. 1.

As shown in FIG. 2, the shaft material 2 as a base material has a sectional shape which is substantially constant in the axial direction, and an outside diameter $D_0$ of the shaft material 2 is larger than an outside diameter D (refer to FIG. 1) of the hollow rack bar 1.

<Preforming Step>

Figure 3:
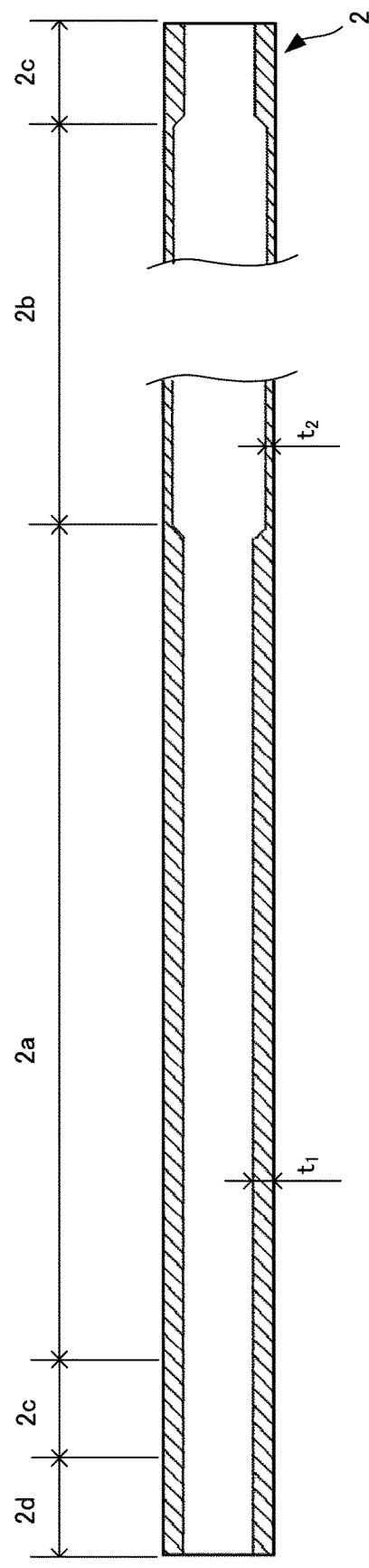
FIG. 3 is a schematic drawing showing another manufacturing step of the rack bar in FIG. 1.

Next, as shown in FIG. 3, the shaft material 2, which is a base material, is drawn and preformed so that sections of the shaft material 2 are given thicknesses suitable for designed purposes of the individual sections. In this preforming, a toothed section forming region 2a configured to form a toothed section 6 is formed to have a thickness $t_1$, a shaft section forming region 2b configured to form a shaft section 7 is formed to have a thickness $t_2$, and a joining section forming region 2c configured to form a joining section 4 is formed to have a thickness $t_1$. A distal end region 2d lying adjacent to one joining section forming region 2c is an auxiliary region which is drawn during drawing and is cut off after the preforming is completed.

<Rack Forming Step>

Figure 4:
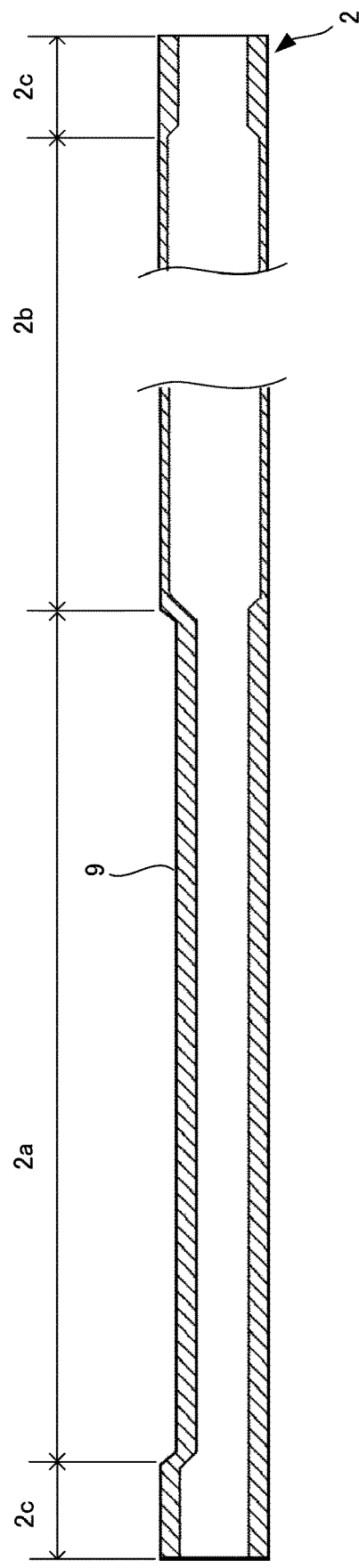
FIG. 4 is a schematic drawing showing a further manufacturing step of the rack bar in FIG. 1.

In this embodiment, the rack 3 is formed through rolling using a tooth die. Specifically, firstly, as shown in FIG. 4, part of an outer surface of the toothed section forming region 2a of the preformed shaft material 2 is pressed to be collapsed flat, whereby a flat rack forming surface 9, extending in the axial direction of the shaft material 2, is formed.

Figure 5:
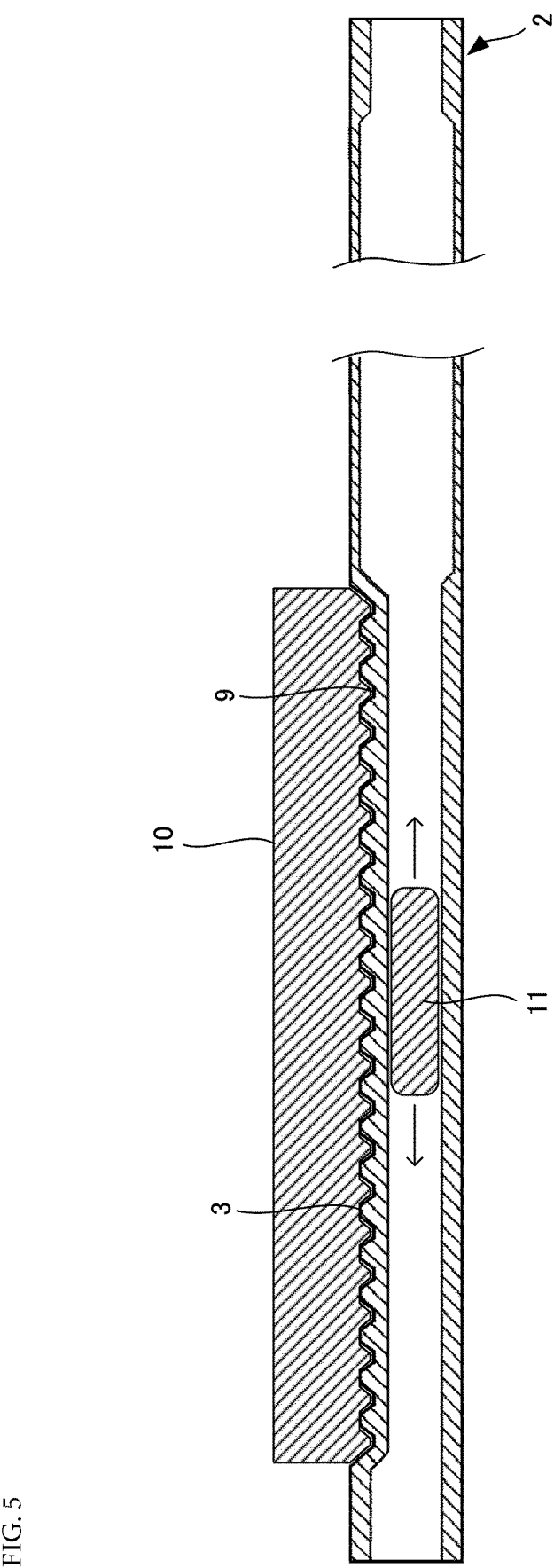
FIG. 5 is a schematic drawing showing a manufacturing step of the rack bar in FIG. 1.

Next, as shown in FIG. 5, a tooth die 10 is pressed against the rack forming surface 9, and a mandrel 11 is press fitted in the shaft material 2 in that state. A material of the rack forming surface 9 is worked by the plied mandrel 11 as the mandrel 11 is press fitted and then bites into the tooth die 10. Then, the mandrel 11 is replaced by a gradually larger mandrel which is press fitted instead, and this gradually larger mandrel is then replaced by another gradually larger mandrel which is press fitted instead. Repeating such a replacement of mandrels allows the shape of the tooth die 10 to be transferred onto the rack forming surface 9, whereby the rack 3 is formed on it.

The rack 3 may be formed by cutting using, for example, a broaching machine; however, when the rack 3 is formed through rolling using the tooth die 10, the material of the shaft material 2 can be saved on, and the degree of freedom in setting a pitch at which teeth are formed is enhanced.

Thereafter, a female thread 5 (refer to FIG. 1) is formed on an inner circumferential surface of each of the joining section formed regions 2c, whereby the hollow rack bar 1 is manufactured.

Figure 6:
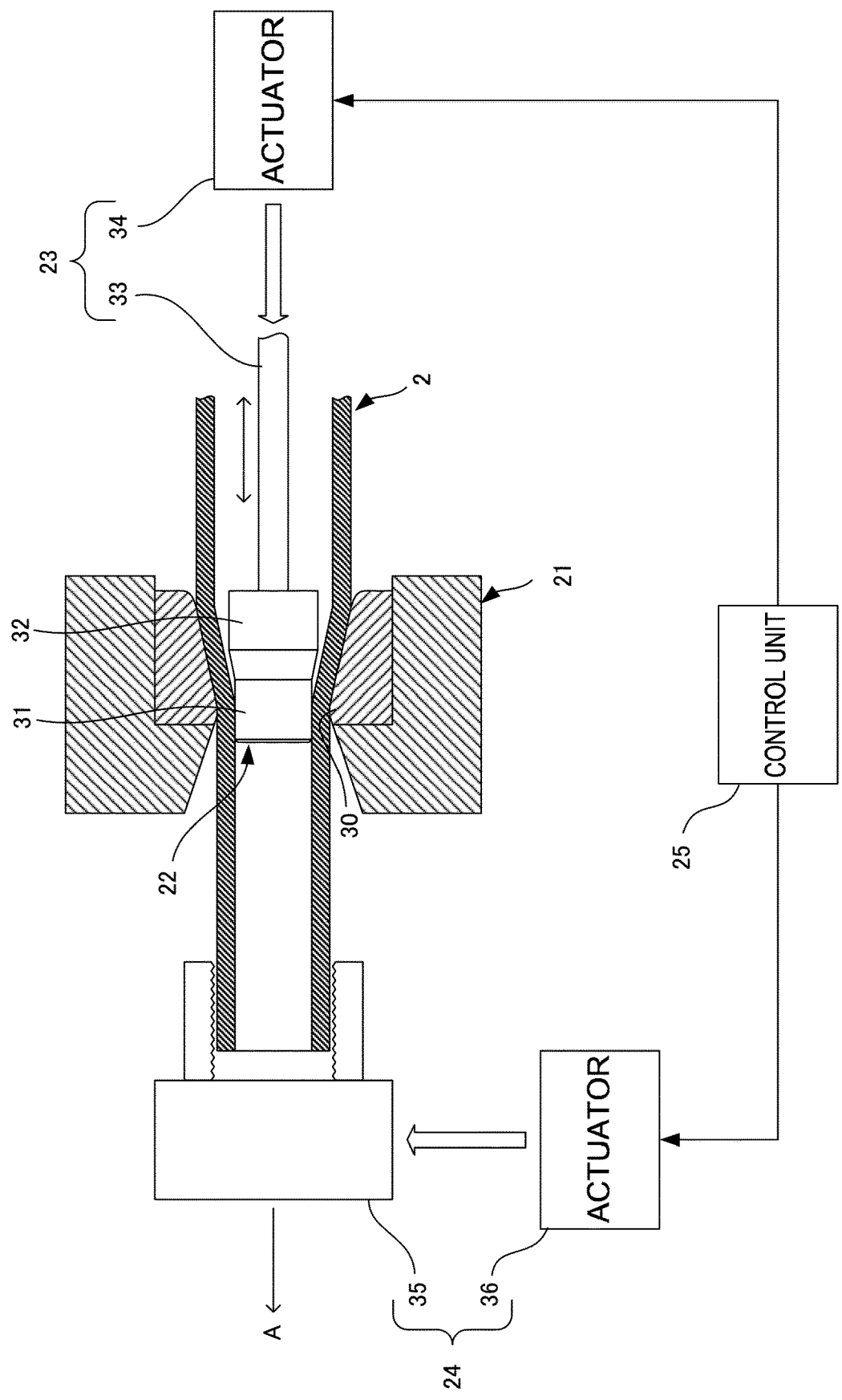
FIG. 6 is a schematic drawing of an apparatus for use in manufacturing the rack bar in FIG. 1.

FIG. 6 shows an apparatus for use in the preforming step.

A drawing apparatus 20 includes a die 21 through which the shaft material 2, which is a base material, is inserted, a plug 22 configured to be accommodated in the shaft material 2, a driving unit 23 configured to move the plug 22 in an axial direction of the shaft material 2, a drawing unit 24 configured to draw the shaft material 2 through between the die 21 and the plug 22, and a control unit 25.

The die 21 has a working section 30 configured to define an outside diameter of the shaft material 2. An inside diameter of the working section 30 is the same as an outside diameter D of the hollow rack bar 1 and is smaller than an outside diameter $D_0$ of the shaft material 2, which is a base material.

The plug 22 has a first working section 31 and a second working section 32 as working sections for providing for an inside diameter of the shaft material 2. The second working section is formed in a larger diameter than that of the first working section and the first working section 31 and the second working section 32 are provided coaxially and adjacent to each other. The plug 22 is accommodated in the second shaft material 2 with the first working section 31, which is relatively smaller in diameter, oriented in a drawing direction of the shaft material 2 indicated by an arrow A in FIG. 6. Then, the plug 22 is caused to move in the axial direction of the shaft material 2 in an interior of the shaft material 2 by the driving unit 23 so that the first working section 31 and the second working section 32 are disposed selectively inside the working section 30 of the die 21.

The driving unit 23 has a support rod 33 which is inserted into the shaft material 2 through an opening at one end portion of the shaft material 2 and an actuator 34 configured to push and retract the support rod 33 in a longitudinal direction of the support rod 33. The plug 22 is held to a distal end portion of the support rod 33 which is inserted into the shaft material 2, and the support rod 33 is moved back and forth in the longitudinal direction by the actuator 34, that is, the support rod 33 is moved back and forth in the axial direction of the shaft material 2, whereby the plug 22 is also moved back and forth in the axial direction of the shaft material 2. For example, an appropriate direct acting device such as a hydraulic cylinder device, a ball screw device or the like is used as the actuator 34.

The drawing unit 24 has a chuck 35 configured to clamp the distal end region 2d (refer to FIG. 3) of the shaft material 2 and an actuator 36 configured to pull the chuck 35 in the drawing direction of the shaft material 2. The chuck 35, clamping the distal end region 2d of the shaft material 2, is pulled in the drawing direction of the shaft material 2 by the actuator 36, whereby the shaft material 2 is drawn through between the die 21 and the plug 22. An appropriate direct acting device such as a hydraulic cylinder device, a ball screw device or the like is used as the actuator 36.

The control unit 25 controls the driving unit 23 and the drawing unit 24 as a whole. The control unit 25 identifies a region of the shaft material 2 which passes through the die 21 based on an amount by which the drawing unit 24 pulls the shaft material 2, drives the driving unit 23 based on the identified region of the shaft material 2, and disposes one of the first working section 31 and the second working section 32 of the plug 22 inside the working section 30 of the die 21.

In drawing the shaft material 2, a lubricant may be applied to an outer circumferential surface and/or an inner circumferential surface of the shaft material 2. A lubricant applied to the inner circumferential surface of the shaft material 2 may be supplied from the plug 22 through, for example, the support rod 33 as occasion demands or may be applied to the plug 22 in advance.

Figure 7:
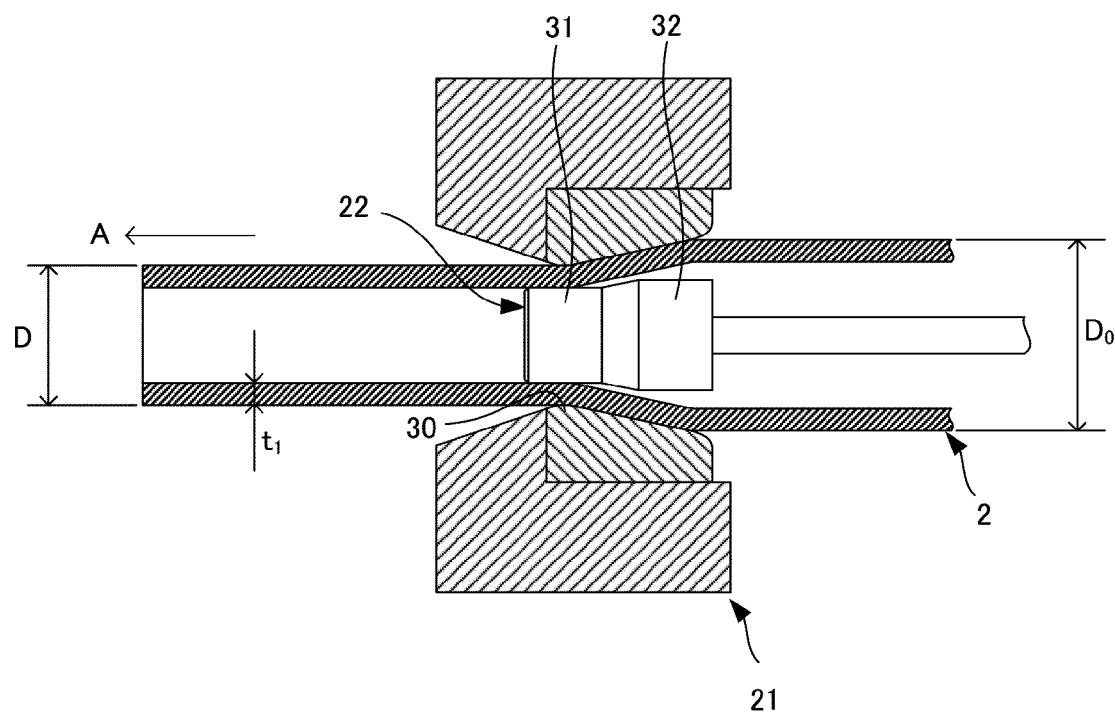
FIG. 7 is a schematic drawing showing an operation of the apparatus in FIG. 6.
Figure 8:
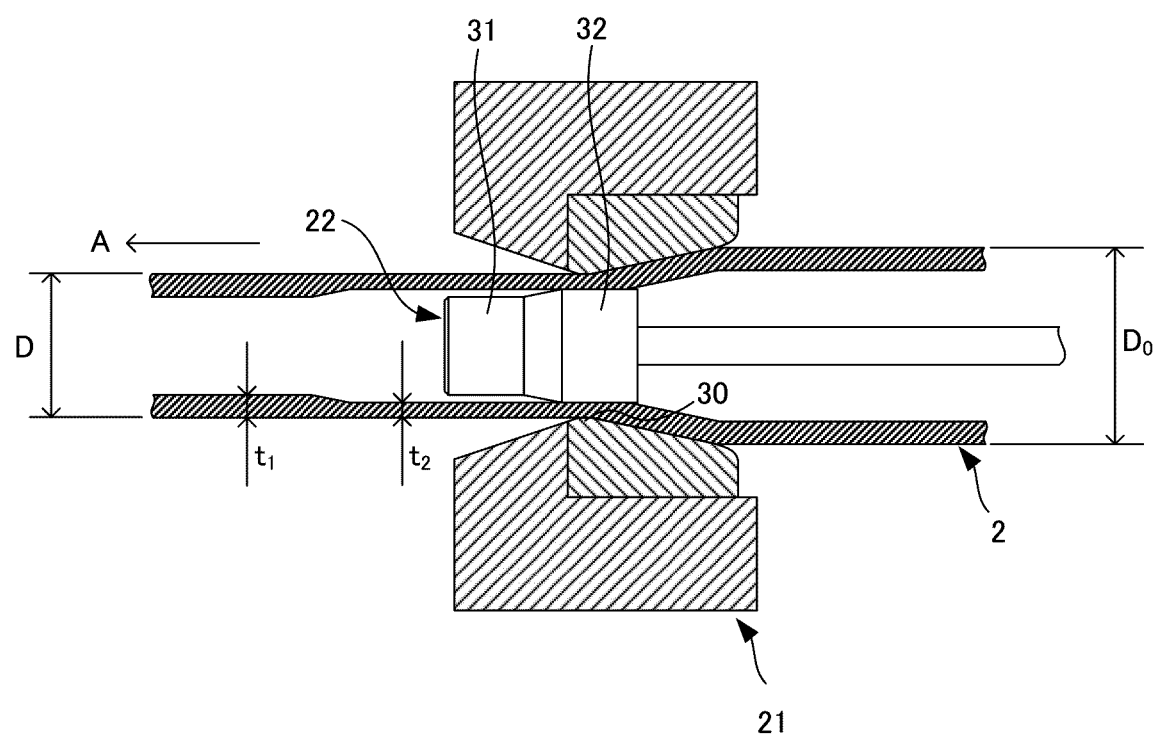
FIG. 8 is a schematic drawing showing another operation of the apparatus in FIG. 6.

FIGS. 7 and 8 show an operation of the drawing apparatus 20.

FIG. 7 shows a case where the toothed section forming region 2a of the shaft material 2 is passing through the die 21, and of the first working section 31 and the second working section 32 of the plug 22, the first working section 31 having the relatively small diameter is disposed inside the working section 30 of the die 21. A gap between the working section 30 and the first working section 31 is the same as the thickness $t_1$ of the toothed section forming region 2a which results after the completion of the preforming step, and the toothed section forming region 2a which is drawn through the die 21 is formed to have the outside diameter D and the thickness $t_1$.

FIG. 8 shows a case where the shaft section forming region 2b of the shaft material 2 is passing through the die 21, and of the first working section 31 and the second working section 32 of the plug 22, the second working section 32 having the relatively large diameter is disposed inside the working section 30 of the die 21. A gap between the working section 30 and the second working section 32 is the same as the thickness $t_2$ of the shaft section forming region 2b which results after the completion of the preforming step, and the shaft section forming region 2b which is drawn through the die 21 is formed to have the outside diameter D and the thickness $t_2$.

When the joining section forming region 2c of the shaft material 2 passes through the die 21, the first working section 31 of the plug 22 is disposed inside the working section 30 of the die 21, and the joining section forming region 2c which is drawn through between the first working section 31 and the working section 30 is formed to have the outside diameter D and the thickness $t_1$.

Thus, as has been described heretofore, the toothed section forming region 2a can be formed relatively thick (the thickness $t_1$) while the shaft section forming region 2b can be formed relatively thin (the thickness $t_2$ ($t_1 > t_2$)) simply and securely as the shaft material 2 is drawn by moving the plug 22 according to the region of the shaft material 2 which passes through the die 21.

A cross section reduction rate of the regions of the shaft material 2 is preferably 10% or larger and 35% or smaller. When referred to herein, the cross section reduction rate means a reduction rate of the cross section which is expressed by $(S_0 - S)/S_0$, where $S_0$ denotes a cross section of the shaft material 2, which is a base material, and S denotes a cross section of the preformed shaft material 2. The shaft material 2 which is a base material prior to preforming typically has an error in outside diameter. Then, the outside diameter accuracy of the preformed shaft material 2 is enhanced by setting the cross section reduction rate at 10% or larger. In addition, preforming is completed through a single drawing while suppressing the occurrence of seizing between the shaft material 2 and the die 21 and/or the plug 22 by setting the cross section reduction rate at 35% or smaller.

Heretofore, the plug 22 is described as having the two working sections, which are the first working section 31 and the second working section 32, as the working section configured to define the inside diameter of the shaft material 2. However, the plug 22 may have three or more working sections. For example, the plug 22 may have a third working section, which is larger in diameter than the first working section 31 and smaller in diameter than the second working section 32, between the first working section 31 and the second working section 32, whereby the thicknesses of the regions of the shaft material 2 can be set in more precise steps. For example, when the joining section forming region 2c of the shaft material 2 is passing through the die 21, the third working section of the plug 22 is disposed inside the working section 30 of the die 21, whereby the joining section forming region 2c where the female thread 5 (refer to FIG. 1) is formed in the later step can be formed thinner than the toothed section forming region 2a but thicker than the shaft section forming region 2b. It should be noted that the working sections of the plug 22 are aligned in the decreasing or increasing order of outside diameters.

The invention claimed is:

1. A manufacturing method for a hollow rack bar made of a hollow shaft material and including a toothed section which has a rack on an outer surface and a shaft section which is thinner than the toothed section, the manufacturing method comprising:
    drawing the hollow shaft material between a die and a plug, and preforming regions of the hollow shaft material including a toothed section formation region configured to become the toothed section and a shaft section formation region configured to become the shaft section so as to have thicknesses according to the respective regions;
    cutting off a distal end region of the hollow shaft material; and
    forming the rack at the toothed section formation region of the hollow shaft material which is preformed,
    wherein the plug has a first working section and a second working section having a larger diameter than the first working section, the first working section and the second working section defining respective inside diameters of the hollow shaft material,
    wherein, in the preforming,
        a chuck of a drawing unit clamps the distal end region of the hollow shaft material and the chuck is pulled in a drawing direction of the hollow shaft material,
        when the toothed section formation region passes through the die, the first working section of the plug is disposed inside a working section of the die configured to define an outside diameter of the hollow shaft material by: (i) identifying a region of the hollow shaft material which passes through the die based on an amount by which the chuck of the drawing unit pulls the hollow shaft material; and (ii) driving a driving unit based on the region of the hollow shaft material which has been identified, and
        when the shaft section formation region passes through the die, the second working section of the plug is disposed by the driving unit inside the working section of the die.

2. The manufacturing method according to claim 1,
wherein a reduction rate from a sectional area at the toothed section formation region before the preforming, to the sectional area at the toothed section formation region after the preforming, is 10% or larger and 35% or smaller, and
wherein the sectional area at the toothed section formation region is perpendicular to an axial direction of the hollow shaft material.

3. The manufacturing method according to claim 1,
wherein, in forming the rack, a mandrel is press-fitted in the hollow shaft material in a state in which a tooth die is pressed against the toothed section formation region and a material of the toothed section formation region is caused to plastically flow towards the tooth die to form the rack.

4. The manufacturing method according to claim 2,
wherein, in forming the rack, a mandrel is press-fitted in the hollow shaft material in a state in which a tooth die is pressed against the toothed section formation region and a material of the toothed section formation region is caused to plastically flow towards the tooth die to form the rack.

* * * * *